(12) United States Patent
Li

(10) Patent No.: US 7,748,916 B2
(45) Date of Patent: Jul. 6, 2010

(54) LENS BARREL

(75) Inventor: Hung-Chih Li, Taichung (TW)

(73) Assignee: Genius Electronic Optical Co., Ltd., Ta-Ya Shiang, Taichung (TW)

( * ) Notice: Subject to any disclaimer, the term of this patent is extended or adjusted under 35 U.S.C. 154(b) by 727 days.

(21) Appl. No.: 11/705,400

(22) Filed: Feb. 13, 2007

(65) Prior Publication Data

US 2008/0124066 A1  May 29, 2008

(30) Foreign Application Priority Data

Nov. 23, 2006 (TW) .............................. 95220691 U

(51) Int. Cl.
G03B 17/00 (2006.01)
G03B 11/00 (2006.01)
G02B 7/02 (2006.01)

(52) U.S. Cl. .................. 396/529; 396/533; 396/544; 359/829

(58) Field of Classification Search ................ 396/529
See application file for complete search history.

(56) References Cited

U.S. PATENT DOCUMENTS

| 3,895,858 | A | * | 7/1975 | Sawano | 359/825 |
| 4,415,242 | A | * | 11/1983 | Major | 359/612 |
| 5,528,328 | A | * | 6/1996 | O'Farrill et al. | 396/544 |
| 5,870,232 | A | * | 2/1999 | Tsuji et al. | 359/700 |
| 6,963,694 | B2 | * | 11/2005 | Nomura | 396/73 |
| 7,565,078 | B2 | * | 7/2009 | Liu et al. | 396/533 |

* cited by examiner

*Primary Examiner*—Melissa J Koval
(74) *Attorney, Agent, or Firm*—Browdy and Neimark, PLLC

(57) ABSTRACT

A lens barrel for holding a lens group therein has a body with a peripheral on which an external thread is formed. The external thread has a plurality of turns which are partially interrupted by at least one threadless segment such that the external thread has at least one of the turns completely extending around the periphery of the body. As a result of the threadless segment, the friction which is generated upon screwingly engaging the lens barrel into a coupling socket can be reduced.

10 Claims, 4 Drawing Sheets ical examples, while indicating preferred
LENS BARREL

BACKGROUND OF THE INVENTION

1. Field of the Invention

The present invention relates generally to lens barrels, and more particularly, to a lens barrel, which allows smooth adjustment and ensures accurate positioning.

2. Description of the Related Art

FIG. 1 shows a conventional lens barrel for holding lenses therein. The lens barrel comprises a body 1 and an external thread 2 continuously spirally extending around the periphery of the body 1 for allowing fastening of the lens barrel to the internal thread of a camera's socket. The lens barrel can be rotated clockwise and counterclockwise, resulting in an axial movement relative to the socket to adjust the distance between the barrel and the image sensor in the camera for lens focusing.

However, because the external thread 2 is continuously spirally extending around the whole area of the periphery of the body 1, the external thread 2 is in full contact with the internal thread of the socket after engagement of the lens barrel in the socket. When adjusting the focus of the lens, a great friction is produced between the lens barrel and the socket. Therefore, the user must employ much effort to do the focusing adjustment.

There is known a lens barrel in which an axial plane cut through the external thread to reduce contact area between the lens barrel and the matching socket and to allow adjustment of focus with less effort. However, the axial plane interrupts the external thread, lowering the functioning of the external thread in guiding spiral rotation of the lens barrel into the matching socket and in positioning the lens barrel in the matching socket. In addition, this design may result in the light-leaking problem.

SUMMARY OF THE INVENTION

The present invention has been accomplished under the circumstances in view. It is one objective of the present invention to provide a lens barrel, which allows smooth adjustment and ensures accurate positioning.

To achieve this objective of the present invention, the lens barrel for holding a lens group therein comprises a body with a peripheral on which an external thread is formed. The external thread has a plurality of turns which are partially interrupted by at least one threadless segment such that the external thread has at least one of the turns completely extending around the periphery of the body. By means of the threadless segment, the friction which is generated upon screwingly engaging the lens barrel into a coupling socket can be reduced. The completely extending turns of the thread can not only guide the engagement action smoothly when the lens barrel is screwingly engaged into the socket but also avoid the light-leaking problem after engagement of the lens barrel with the socket.

In a preferred embodiment of the present invention, the turns of the thread are partially interrupted by two threadless segments which are symmetrically spaced on the periphery of the body at two opposite sides. The two threadless segments are located adjacent to a top end of the body. In another preferred embodiment of the present invention, the two threadless segments are located adjacent to a bottom end of the body. In still another preferred embodiment of the present invention, the two threadless segments are located at a middle of the periphery of the body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
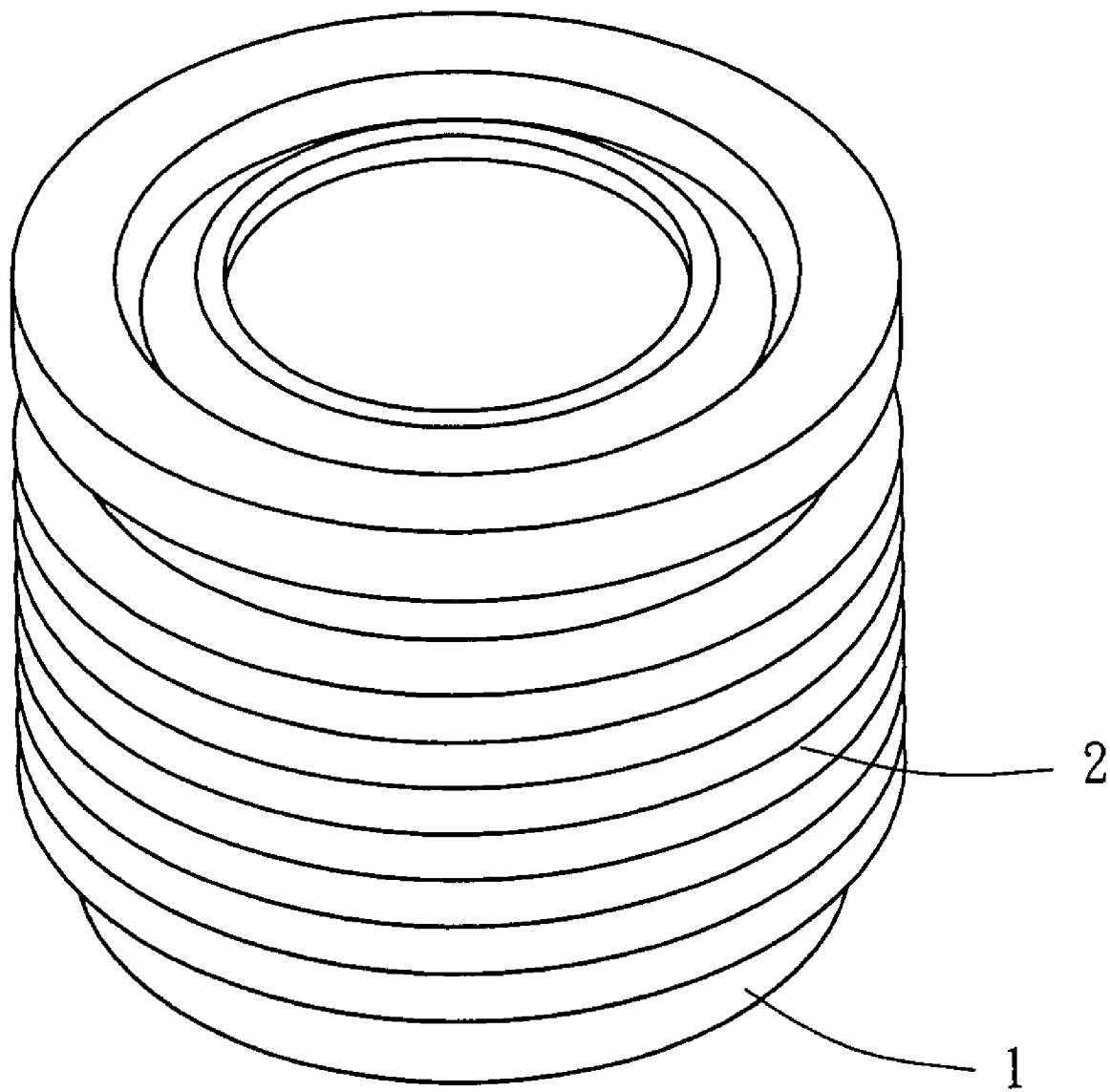
FIG. 1 is a perspective view of a lens barrel according to the prior art.
Figure 2:
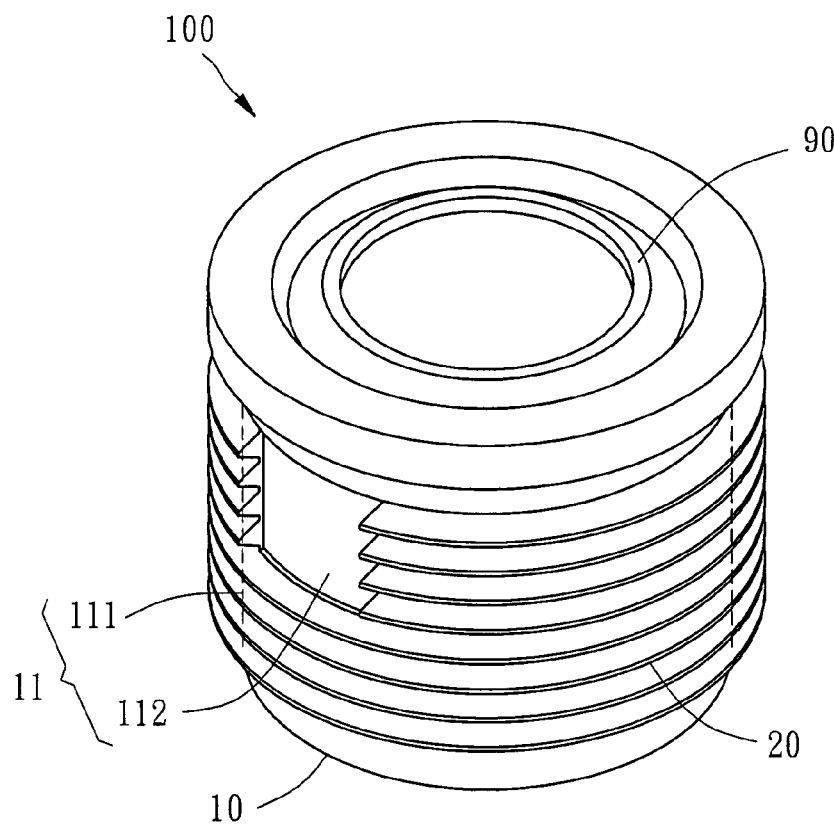
FIG. 2 is a perspective view of a lens barrel in accordance with a first preferred embodiment of the present invention.
Figure 3:
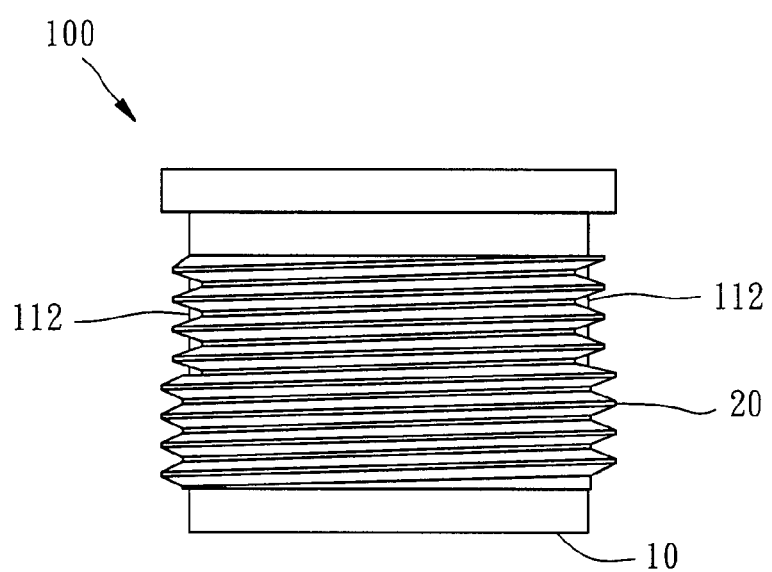
FIG. 3 is a schematic side view of the lens barrel according to the first preferred embodiment of the present invention.

As shown in FIGS. 2 and 3, a lens barrel 100 in accordance with a first preferred embodiment of the present invention for holding a lens group 90 therein has a body 10 and an external thread 20.

The body 10 has a peripheral 11, and an axial hole extending through the top and bottom ends of the body 10. The peripheral 11 is defined having two threadless segments 112 symmetrically located at two opposite sides thereof, and the rest segment, i.e. the thread segment 111. The threadless segments 112 are located adjacent to the top end of the body 10, as shown in FIG. 3. The axial hole of the body 10 is adapted to accommodate the lens group 90.

The external thread 20 is formed on the thread segment 111 of the periphery 11 of the body 10, having a continuous part continuously extending around the peripheral 11 through a number of turns and an interrupted part extending around the peripheral 11 through a number of turns and interrupted by the threadless segments 112. In other words, the external thread 20 has a plurality of turns formed on the periphery 11 and partially interrupted by the two threadless segments 112.

When the external thread 20 of the lens barrel 100 is threaded into the internal thread of a socket (not shown), the smoothly arched surfaces of the threadless segments 112 are kept spaced from the internal thread of the socket by a gap, thereby reducing friction between the lens barrel 100 and the socket. Therefore, the user can rotate the lens barrel 100 in and out of the socket smoothly with less effort. Further, the continuous part of the external thread 20, which has at least one turn completely and continuously extending around the periphery 11, guides spiral rotation of the lens barrel 100 into the socket smoothly in course. Further, the continuous part of the external thread 20 effectively avoids leakage of light through the threadless segments 112.

Figure 4:
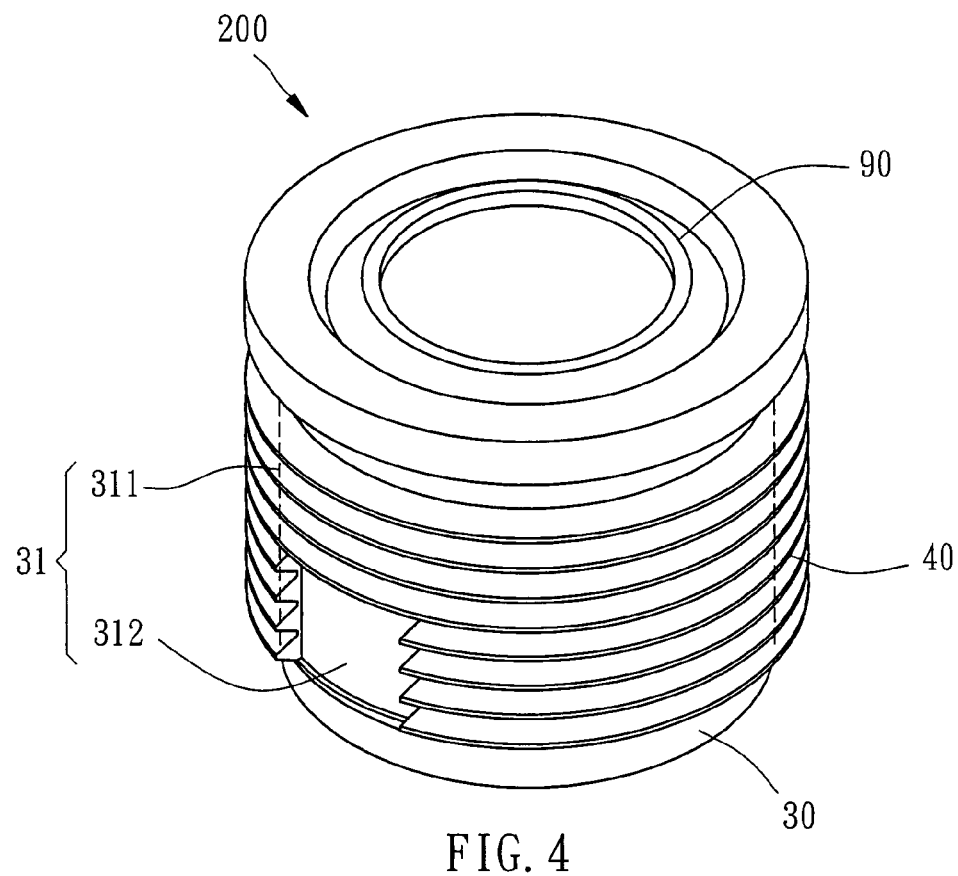
FIG. 4 is a perspective view of a lens barrel in accordance with a second preferred embodiment of the present invention.
Figure 5:
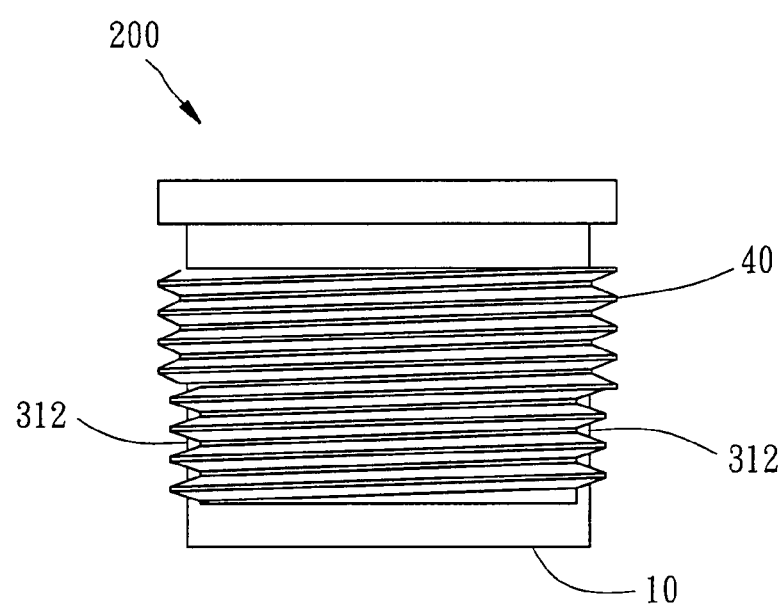
FIG. 5 is a schematic side view of the lens barrel according to the second preferred embodiment of the present invention.

FIGS. 4 and 5 show a lens barrel in accordance with a second preferred embodiment of the present invention. According to this embodiment, the lens barrel, referenced by 200, holds a lens group 90 therein and has a body 30 and an external thread 40.

The body 30 has a peripheral 31, and an axial hole extending through the top and bottom ends of the body 30. The peripheral 31 is defined having two threadless segments 312 symmetrically located at two opposite sides of the periphery, and a thread segment 311. The threadless segments 312 are located adjacent to the bottom end of the body 31 as shown in FIG. 5. The axial hole of the body 30 is adapted to accommodate the lens group 90.

The external thread 40 is formed on the thread segment 311, having a continuous part continuously extending around the peripheral 31 through a number of turns and an interrupted part extending around the peripheral 31 through a number of turns and interrupted by the threadless segments 312.

This second embodiment is substantially similar to the aforesaid first embodiment with the exception of the locations of the threadless segments; however, both two embodiments achieve the same effect.

Figure 6:
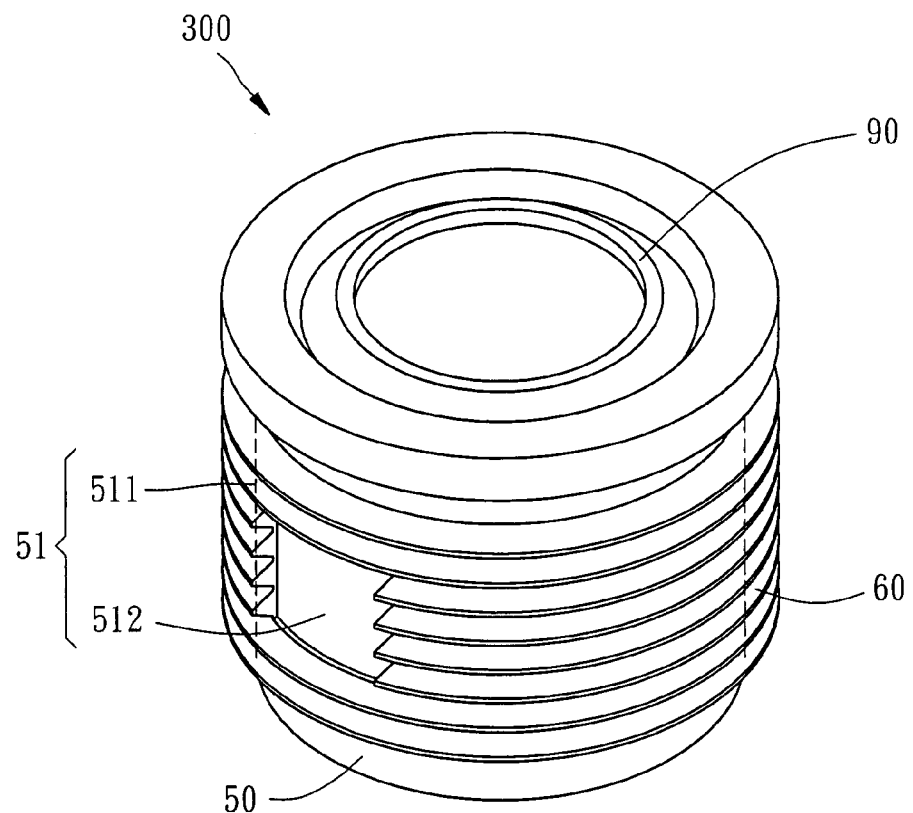
FIG. 6 is a perspective view of a lens barrel in accordance with a third preferred embodiment of the present invention.
Figure 7:
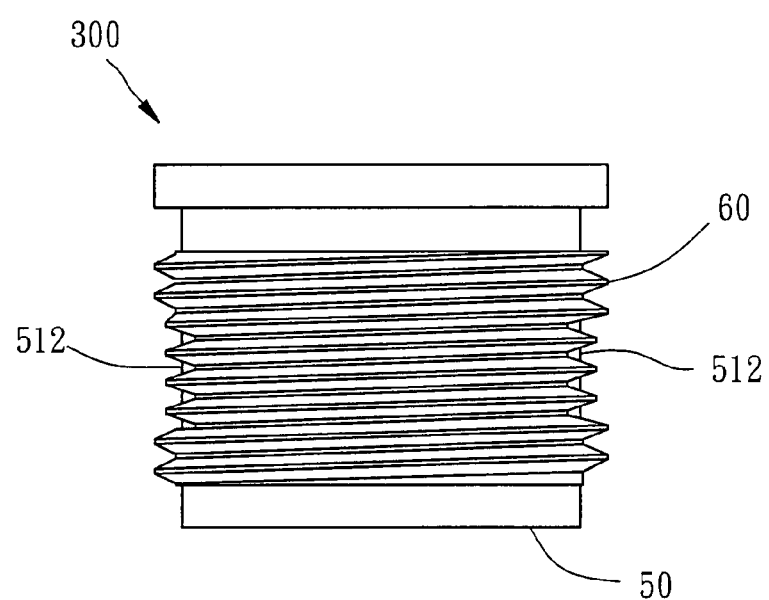
FIG. 7 is a schematic side view of the lens barrel according to the third preferred embodiment of the present invention.

FIGS. 6 and 7 show a lens barrel in accordance with a third preferred embodiment of the present invention. According to this embodiment, the lens barrel, referenced by 300, holds a lens group 90 therein and has a body 50 and an external thread 60.

The body 50 has a peripheral 51, and an axial hole extending through the top and bottom ends of the body 50. The peripheral 51 is defined having two threadless segments 512 symmetrically located at two opposite sides of the middle of the peripheral 51 as shown in FIG. 7, and a thread segment 511.

The external thread 60 is formed on the thread segment 511, having a continuous part continuously extending around the peripheral 51 through a number of turns and an interrupted part extending around the peripheral 51 through a number of turns and interrupted by the threadless segments 512.

This third embodiment is substantially similar to the aforesaid first and second embodiments with the exception of the locations of the threadless segments; however, this third embodiment achieves the same effect.

Although particular embodiments of the invention have been described in detail for purposes of illustration, various modifications and enhancements may be made without departing from the spirit and scope of the invention. For example, the body can be made having only one single threadless segment, or more than three threadless segments equiangularly spaced around the peripheral of the body. Accordingly, the invention is not to be limited except as by the appended claims.

What is claimed is:

1. A lens barrel comprising a body with a periphery on which an external thread is formed;
   wherein the external thread has a plurality of turns that are partially interrupted by at least one threadless segment such that the external thread has at least one of the turns completely extending around the periphery of the body.

2. The lens barrel as claimed in claim 1, wherein the at least one threadless segment is formed adjacent to an end of the body.

3. The lens barrel as claimed in claim 1, wherein the at least one threadless segment is formed at a middle of the periphery of the body.

4. The lens barrel as claimed in claim 3, wherein the turns of the external thread are partially interrupted by two said threadless segments that are symmetrically formed at the middle of the periphery of the body.

5. The lens barrel as claimed in claim 1, wherein the turns of the external thread are partially interrupted by two said threadless segments.

6. The lens barrel as claimed in claim 5, wherein the two threadless segments are symmetrically formed on the periphery of the body at two opposite sides.

7. The lens barrel as claimed in claim 1, wherein the turns of the external thread are partially interrupted by three said threadless segments.

8. The lens barrel as claimed in claim 7, wherein the three threadless segments are equiangularly spaced around the periphery of the body.

9. The lens barrel as claimed in claim 1, wherein the turns of the external thread are partially interrupted by four said threadless segments.

10. The lens barrel as claimed in claim 9, wherein the four threadless segments are equiangularly spaced around the periphery of the body.

* * * * *